United States Patent
Hoggett et al.

(10) Patent No.: US 10,982,102 B2
(45) Date of Patent: Apr. 20, 2021

(54) LOW ENERGY CURING OFFSET AND LETTERPRESS PRINTING INKS AND PRINTING PROCESS

(71) Applicant: SICPA HOLDING SA, Prilly (CH)

(72) Inventors: John Hoggett, Thonon (FR); Stéphane Chabrier, Belmont-sur-Lausanne (CH)

(73) Assignee: SICPA HOLDING SA, Prilly (CH)

(*) Notice: Subject to any disclaimer, the term of this patent is extended or adjusted under 35 U.S.C. 154(b) by 40 days.

(21) Appl. No.: 16/466,590

(22) PCT Filed: Dec. 4, 2017

(86) PCT No.: PCT/EP2017/081342
§ 371 (c)(1),
(2) Date: Jun. 4, 2019

(87) PCT Pub. No.: WO2018/104213
PCT Pub. Date: Jun. 14, 2018

(65) Prior Publication Data
US 2019/0345350 A1    Nov. 14, 2019

(30) Foreign Application Priority Data
Dec. 9, 2016 (EP) ..................... 16203168

(51) Int. Cl.
| C09D 11/10 | (2014.01) |
| C09D 11/101 | (2014.01) |
| B41M 3/14 | (2006.01) |
| C09D 11/03 | (2014.01) |
| C09D 11/107 | (2014.01) |
| C09D 11/12 | (2006.01) |

(52) U.S. Cl.
CPC ............ *C09D 11/101* (2013.01); *B41M 3/14* (2013.01); *C09D 11/03* (2013.01); *C09D 11/107* (2013.01); *C09D 11/12* (2013.01)

(58) Field of Classification Search
CPC ......... C09J 11/101; C09J 11/107; C09J 11/03; C09J 11/50; C09J 11/12; B41M 3/14
See application file for complete search history.

(56) References Cited

U.S. PATENT DOCUMENTS

| 4,604,952 | A | 8/1986 | Daugherty |
| 5,074,914 | A | 12/1991 | Shirota et al. |
| 5,997,622 | A | 12/1999 | Weber et al. |
| 6,001,161 | A | 12/1999 | Evans et al. |
| 6,565,770 | B1 | 5/2003 | Mayer et al. |
| 7,108,742 | B2 | 9/2006 | Hall-Goulle et al. |
| 2010/0189965 | A1 | 7/2010 | Pratt et al. |

FOREIGN PATENT DOCUMENTS

| CN | 102066507 A | 5/2011 |
| CN | 103333544 A | 10/2013 |
| CN | 103436095 A | 12/2013 |
| EP | 1790701 | 5/2007 |
| JP | 62-190272 | 8/1987 |
| JP | 63-218766 | 9/1988 |
| JP | 02-080470 | 3/1990 |
| JP | 2015-038202 A | 2/2015 |
| WO | 2007060133 | 5/2007 |
| WO | 2008033059 | 3/2008 |
| WO | 2008092522 | 8/2008 |
| WO | 2009005733 | 1/2009 |
| WO | 2009/156400 A1 | 12/2009 |
| WO | 2010115986 | 10/2010 |
| WO | 2014165323 | 10/2014 |

OTHER PUBLICATIONS

UV Power Puck® II radiometer from EIT, Inc., (2009), U.S.A., 32 pages.
IEC60404-1 (2000), 118 pages.
International Search Report and Written Opinion issued on with respect to application No. PCT/EP2017/081342, 10 pages.
Chinese Office Action in counterpart Chinese Application No. 201780075961.0 dated Sep. 29, 2020 (with English machine translation).

*Primary Examiner* — Sanza L. McClendon
(74) *Attorney, Agent, or Firm* — Muncy, Geissler, Olds & Lowe, P.C.

(57) ABSTRACT

The present invention relates to the field of low energy radically curable inks for offset or letterpress printing of security documents. In particular, the invention relates to low energy radically curable offset or letterpress printing inks for offset or letterpress printing on a substrate or security document, said low energy radically curable inks having a viscosity in the range of about 2.5 to about 25 Pa s at 40° C. and 1000 s$^{-1}$ and comprising radically curable (meth)acrylate compounds, one or more one or more photoinitiators of formula (I), one or more machine readable materials and one or more fillers and/or extenders.

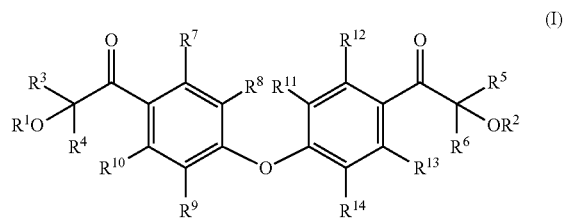

(I)

16 Claims, No Drawings

LOW ENERGY CURING OFFSET AND LETTERPRESS PRINTING INKS AND PRINTING PROCESS

FIELD OF THE INVENTION

The present invention relates to the field of the protection of security document against counterfeit and illegal reproduction. The present invention relates to the field of low energy radically curable offset and letterpress printing inks and processes for producing security features on security documents.

BACKGROUND OF THE INVENTION

With the constantly improving quality of color photocopies and printings and in an attempt to protect security documents such as banknotes, value documents or cards, transportation tickets or cards, tax banderols, and product labels that have no reproducible effects against counterfeiting, falsifying or illegal reproduction, it has been the conventional practice to incorporate various security means in these documents. Typical examples of security means include security threads, windows, fibers, planchettes, foils, decals, holograms, watermarks, security inks comprising optically variable pigments, magnetic or magnetizable thin-film interference pigments, interference-coated particles, thermochromic pigments, photochromic pigments, luminescent, infrared-absorbing, ultraviolet-absorbing or magnetic compounds.

Machine readable inks, such as for example magnetic inks, luminescent inks and IR absorbing inks, have been widely used in the field of security documents, in particular for banknotes printing, to confer the security document an additional covert security feature. The protection of security document against counterfeit and illegal reproduction provided by covert security features relies on the concept that such features typically require specialized equipment and knowledge for their detection. In the field of security and protecting value documents and value commercial goods against counterfeiting, falsifying and illegal reproduction, it is known in the art to apply machine readable security inks by different printing processes including printing processes using high viscous or pasty inks such as offset printing, letterpress printing and intaglio printing (also referred in the art as engraved steel die or copper plate printing). UV radically curable pigmented offset printing inks and UV radically curable pigmented letterpress printing inks are used in the field of the protection of security document against counterfeit and illegal reproduction to be applied as thin layers on security documents in the form of security features.

Failure of the ink to rapidly and efficiently dry results in set off. Set off occurs when a printing ink which is not dried or cured adheres to the back of a printed substrate placed on top of it during the stacking of printed substrates as it comes off the presses (see e.g. U.S. Pat. No. 4,604,952). This is a particular problem during the printing of security features on security documents, especially banknotes, since said documents typically carry a multitude of overlapping or partially overlapping security features which are applied one after the other. If the previously applied security feature, e.g. a background image or graphic pattern, has not yet sufficiently dried, the whole multi-step printing process is not only delayed but also the so-obtained security feature may still suffer from set off or marking due to set off on the machine during any subsequent printing or process operations.

Conventional banknote printing processes use printing technologies including offset printing, intaglio printing, silkscreen printing, flexography printing and letterpress printing, in a series of steps separated by drying periods of the just printed ink layer.

During a conventional banknote printing process, offset inks are applied during one of the first steps of overall multi-step printing process, wherein the offset printing is followed with an intaglio printing step. If a security feature is printed on a security document such as a banknote by an offset printing process and if said security feature suffer from low surface curing properties, the subsequent intaglio printing step might be delayed or produce set off. During an intaglio (also referred in the art as engraved copper plate printing and engraved steel die printing) printing process, an engraved steel cylinder carrying a heated plate engraved with a pattern or image to be printed is supplied with inks of inking cylinder(s) (or chablon cylinder), each inking cylinder being inked in at least one corresponding color to form security features. The inked intaglio plate is brought into contact with the substrate and the ink is transferred under pressure from the engravings of the intaglio printing plate onto the substrate to be printed forming a thick printing layer in the form of reliefs, said resulting from the ink layer thickness and the embossing of the substrate. One of the distinguishing features of the intaglio printing process is that the thickness of the ink transferred to the substrate can be varied from a few micrometers to several tens of micrometers by using correspondingly shallow or respectively deep recesses of the intaglio printing plate. Accordingly, it is critical that the offset inks are completely dried before starting intaglio printing in order to avoid any set off issues, said set off issues being pronounced for the subsequent intaglio printing process due the high pressure applied to piles of printed substrates.

During a conventional banknote printing process, letterpress inks are applied during one of the last steps of overall multi-step printing process, wherein the letterpress printing is followed with a cutting process using for example a trimmer or guillotine wherein sheets comprising a plurality of banknotes are cut so as to form individual banknotes for their circulation. If a security feature is printed on a security document such as a banknote by a letterpress printing process and if said security feature suffer from low surface curing properties, the subsequent cutting step might be delayed or produce set off. Letterpress printing (also referred in the art as letterpress relief printing and typography), is a method consisting of transferring an ink from a hard metal printing plate comprising raised elements, such as letters, numbers, symbols, lines or dots. The raised printing elements are coated with a layer of ink of constant thickness by the application of rollers. The ink is then transferred to an article or a substrate. The letterpress printing technique is typically used for the purpose of numbering the banknotes, i.e. providing banknotes with one or more unique serial numbers.

Accordingly, it is critical that the letterpress inks are completely dried before starting the cutting step in order to avoid any set off issues, said set off issues being pronounced for the subsequent cutting step process due the high pressure applied to piles of printed substrates.

UV radically curable inks are cured by free radical mechanisms consisting of the activation by energy of one or more free radical photoinitiators which liberate free radicals which in turn initiate the polymerization so as to form a layer or coating. Known free radical photoinitiators include acetophenones, benzophenones, alpha-aminoketones, alpha-hydroxyketones, phosphine oxides and phosphine oxide derivatives and benzyldimethyl ketals.

With the aim of providing environmentally friendly solutions, systems and UV mercury medium pressure lamps for curing inks with low energy (LE or HUV) have been developed. Low energy mercury medium pressure lamps have emission spectrum in UV-A and UV-B regions and have less than 5% of the UV energy in UV-C emission. Said systems and lamps produce a reduced amount of light emitted in the ozone-generating wavelengths of the spectrum that occurs with conventional UV lamps such as medium pressure mercury lamps.

UV-curing efficiency of a coating or ink layer depends not only on the overlap of the emission spectrum of the irradiation source used for said curing and the absorption spectrum of the photoinitiator comprised in the coating or ink layer but also on the intensity of the emission spectrum of the irradiation source and on the molar absorption coefficient of the photoinitiator at the wavelength of the emission spectrum of the irradiation source. Accordingly, UV-curing of coatings or ink layers comprising conventionally used free radical photoinitiators with UV-LE lamps suffers from a reduced curing efficiency as a result of the poor overlap of the emission spectrum of UV-LE lamp with the absorption of the said conventionally used free radical photoinitiators, thus leading to slow or poor curing or curing defects.

Since machine readable security inks typically comprise a high amount of pigments, said inks are particularly difficult to cure due to the filtering effect of said pigments which reduced the amount of UV-irradiation available for the photoinitiators.

With the aim of overcoming the poor curing properties of UV-curing with UV-LE lamps, acyl-phosphine photoinitiators have been used due to their red-shifted absorption spectrum. However, acyl-phosphine photoinitiators are known to be particularly sensitive to oxygen inhibition and not highly efficient for surface curing or curing of thin layers. Oxygen inhibition during UV-curing of coatings layers is in particular an issue for thin UV-curable layers.

Thus, there remains a need for low energy curable pigmented offset and letterpress printing inks, and processes for printing security features on security documents at high speed (i.e. industrial speed), said printing security features combining good surface cure and good through-cure properties after having cured said inks with a radiation wavelength of 280 to 400 nm (low energy lamps).

SUMMARY OF THE INVENTION

Accordingly, it is an object of the present invention to overcome the deficiencies of the prior art as discussed above. This is achieved by the provision of a using one or more photoinitiators of formula (I) in a radically curable offset or letterpress printing ink, wherein said radically curable offset or letterpress printing ink has a viscosity in the range of about 2.5 to about 25 Pa s at 40° C. and 1000 s$^{-1}$ and comprises radically curable (meth)acrylate compounds, one or more machine readable materials selected from the group consisting of luminescent materials, magnetic materials, IR absorbing materials and mixtures thereof, and one or more filers and/or extenders.

Described herein are low energy radically curable offset or letterpress printing inks having a viscosity in the range of about 2.5 to about 25 Pa s at 40° C. and 1000 s' for printing a security feature on a substrate or security document, said low energy radically curable offset or letterpress printing ink comprising:

i) from about 10 wt. % to about 80 wt. % of radically curable (meth)acrylate compounds;
ii) from about 1 wt. % to about 20 wt. % of one or more photoinitiators of formula (I):

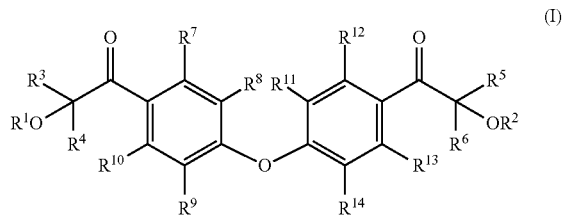

wherein
$R^1$, $R^2$ are identical or different from each other and are selected from the group consisting of hydrogen, $C_1$-$C_4$-alkyls and $Si(R^{15})_3$; preferably selected from the group consisting of hydrogen and $C_1$-$C_4$-alkyls, and more preferably hydrogen;
$R^3$, $R^4$, $R^5$, $R^6$ are identical or different from each other and are selected from the group consisting of hydrogen and $C_1$-$C_4$-alkyls, preferably $C_1$-$C_4$-alkyls, and more preferably methyls;
$R^7$, $R^8$, $R^9$, $R^{10}$, $R^{11}$, $R^{12}$, $R^{13}$, $R^{14}$ are identical or different from each other and are selected from the group consisting of hydrogen and $C_1$-$C_4$-alkyls and halogens, preferably from the group consisting of hydrogen and $C_1$-$C_4$-alkyls, and more preferably hydrogen; and
$R^{15}$ is selected from the group consisting of $C_1$-$C_4$-alkyls, phenyl, $C_1$-$C_4$-hydroxyalkyls and $C_5$-$C_8$-cycloalkys;
iii) from about 1 wt. % to about 60 wt. % of one or more machine readable materials selected from the group consisting of luminescent materials, magnetic materials, IR absorbing materials and mixtures thereof; and
iv) from about 0.5 wt. % to about 20 wt. % of one or more filers and/or extenders, the weight percents being based on the total weight of the low energy radically curable offset or letterpress printing ink.

Described herein are processes for producing for printing a security feature on a substrate by an offset or letterpress printing process comprising the steps of applying the low energy radically curable offset or letterpress printing ink described herein by offset printing or letterpress printing so as to form a coating or layer, and curing the coating or layer with a UV lamp (280 to 400 nm) at a dose of at least 50 mJ/cm$^2$, preferably at least 100 mJ/cm$^2$.

Also described herein are security features comprising a layer or coating made of the low energy radically curable offset or letterpress printing ink described herein. Described herein are uses of the security features described herein for the protection of a security document against counterfeiting or fraud and security documents comprising one or more of the security features described herein.

Also described herein are security documents comprising the one or more security features described herein.

Also described herein are uses of the one or more photoinitiators described herein in an amount from about 1 wt. % to about 20 wt. % for producing a low energy radically curable offset or letterpress printing ink having a viscosity in the range of about 2.5 to about 25 Pa s at 40° C. and 1000 s$^{-1}$, said low energy radically curable offset or letterpress printing ink being suitable for printing a security feature on a security document, said low energy radically curable offset or letterpress printing ink comprising i) from about 10 wt. % to about 80 wt. % of radically curable (meth)acrylate compounds;
ii) from about 1 wt. % to about 60 wt. % of one or more machine readable materials selected from the group consisting of luminescent materials, magnetic materials, IR absorbing materials and mixtures thereof; and
iii) from about 0.5 wt. % to about 20 wt. % of one or more fillers and/or extenders, the weight percents being based on the total weight of the low energy radically curable offset or letterpress printing ink.

DETAILED DESCRIPTION

Definitions

The following definitions clarify the meaning of the terms used in the description and in the claims.

As used herein, the indefinite article "a" indicates one as well as more than one and does not necessarily limit its referent noun to the singular.

As used herein, the term "about" means that the amount, value or limit in question may be the specific value designated or some other value in its neighborhood. Generally, the term "about" denoting a certain value is intended to denote a range within ±5% of the value. For example, the phrase "about 100" denotes a range of 100±5, i.e. the range from 95 to 105. Generally, when the term "about" is used, it can be expected that similar results or effects according to the invention can be obtained within a range of ±5% of the indicated value. However, a specific amount, value or limit supplemented with the term "about" is intended herein to disclose as well the very amount, value or limit as such, i.e. without the "about" supplement.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

As used herein, the term "one or more" means one, two, three, four, etc.

The term "comprising" as used herein is intended to be non-exclusive and open-ended. Thus, for instance an ink comprising a compound A may include other compounds besides A. However, the term "comprising" also covers, as a particular embodiment thereof, the more restrictive meanings of "consisting essentially of" and "consisting of", so that for instance "an ink comprising a compound A" may also (essentially) consist of the compound A.

Where the present description refers to "preferred" embodiments/features, combinations of these "preferred" embodiments/features shall also be deemed as disclosed as long as this combination of "preferred" embodiments/features is technically meaningful.

The term "security feature" is used to denote an image, pattern or graphic element that can be used for authentication purposes.

The term "security document" refers to a document which is usually protected against counterfeit or fraud by at least one security feature. Examples of security documents include without limitation value documents and value commercial goods.

The descriptions of specific embodiments of the present invention are presented for purposes of illustration and description. They are not intended to be exhaustive or to limit the present invention to the precise forms disclosed, and obviously many modifications and variations are possible in light of the above teaching. The exemplary embodiments were chosen and described in order to best explain the principles of the present invention and its practical application, to thereby enable others skilled in the art to best use the present invention and various embodiments with various modifications as are suited to the particular use contemplated.

The present invention provides low energy radically curable offset or letterpress printing inks for producing (printing) a security feature on a security document by an offset printing process or by a letterpress printing process. The present invention further provides security features comprising a coating or a layer made of the low energy radically curable offset or letterpress printing ink described herein and security documents comprising the one or more security features described herein.

The low energy radically curable offset or letterpress printing ink described herein has a viscosity in the range of about 2.5 to about 25 Pa s at 40° C. and 1000 s$^{-1}$; the viscosities being measured on a Haake Roto-Visco RV1 with a cone 2 cm 0.5'.

The low energy radically curable offset or letterpress printing ink described herein comprises radically curable (meth)acrylate compounds. The radically curable (meth)acrylate compounds described herein are present in an amount from about 10 wt. % to about 80 wt. %, preferably from about 20 wt. % to about 80 wt. %, the weight percents being based on the total weight of the low energy radically curable offset or letterpress printing ink described herein.

Radically curable compounds are cured by free radical mechanisms consisting of the activation by energy of one or more photoinitiators which liberate free radicals which in turn initiate the polymerization so as to form a layer or coating.

The radically curable (meth)acrylate compounds described preferably consist of one or more radically curable (meth)acrylate oligomers and one or more radically curable (meth)acrylate monomers. The term "(meth)acrylate" in the context of the present invention refers to the acrylate as well as the corresponding methacrylate. The radically curable (meth)acrylate oligomers described herein are preferably selected from the group consisting of polyepoxy (meth)acrylates, (meth)acrylated oils, (meth)acrylated epoxidized oils, polyester (meth)acrylates, polyether (meth)acrylates, aliphatic or aromatic polyurethane (meth)acrylates, silicone (meth)acrylates, polyamino (meth)acrylates, polyacrylic acid (meth)acrylates, polyacrylate esters (meth)acrylates and mixtures thereof, more preferably selected from the group consisting of polyepoxy (meth)acrylates, polyester (meth)acrylates, aliphatic or aromatic polyurethane (meth)acrylates, silicone (meth)acrylates, polyamino (meth)acrylates, polyacrylic acid (meth)acrylates, polyacrylate esters (meth)acrylates and mixtures thereof. The radically curable (meth)acrylate monomers described herein are preferably selected from the group consisting of 2(2-ethoxyethoxy) ethyl (meth)acrylate, 2-phenoxyethyl (meth)acrylate, C12/C14 alkyl (meth)acrylate, C16/C18 alkyl (meth)acrylate, caprolactone (meth)acrylate, cyclic trimethylolpropane formal (meth)acrylate, nonylphenol (meth)acrylate, isobornyl (meth)acrylate, isodecyl (meth)acrylate, lauryl (meth)acrylate, stearyl (meth)acrylate, octyldecyl (meth)acrylate, tridecyl (meth)acrylate, methoxy poly(ethylene glycol) (meth)acrylate, polypropylene glycol (meth)acrylate, tetrahydrofurfuryl (meth)acrylate, 1,3-butylene glycol di(meth)acrylate, 1,4-butanediol di(meth)acrylate, 1,6-hexanediol di(meth)acrylate, 3-methyl-1,5-pentanedioldi (meth)acrylate, alkoxylated di(meth)acrylate, esterdiol di(meth)acrylate, bisphenol A di(meth)acrylate, bisphenol A ethoxylate di(meth)acrylate, bisphenol A diglycidyl ether di(meth)acrylate, ethylene glycol di(meth)acrylate, diethylene glycol di(meth)acrylate, triethylene glycol di(meth)acrylate, tetraethylene glycol di(meth)acrylate, dipropyleneglycol di(meth)acrylate, tripropylene glycol di(meth)acrylate, polyethylene glycol di(meth)acrylate, neopentyl glycol di(meth)acrylate, tricyclodecane dimethanol di(meth)acrylate, trimethylolpropane tri(meth)acrylate, glyceryl tri(meth)acrylate, propoxylated trimethylolpropane tri(meth)acrylate, propoxylated glyceryl tri(meth)acrylate, pentaerythritol tri(meth)acrylate, pentaerythritol tetra(meth)acrylate, propoxylated pentaerythritol tri(meth)acrylate, trimethylolpropane tri(meth)acrylate, tris (2-hydroxy ethyl) isocyanurate tri(meth)acrylate, ditrimethylolpropane tetra(meth)acrylate, trimethylolpropane ti(meth)acrylate, dipentaerythritol penta(meth)acrylate, pentaerythritol tetra(meth)acrylate, dipentaerythritol tetra(meth)acrylate, dipentaerythritol penta(meth)acrylate, dipentaerythritol hexa(meth)acrylate and their ethoxylated equivalents as well as mixtures thereof, more preferably from the group consisting of 2-phenoxyethyl (meth)acrylate, isodecyl (meth)acrylate, 1,4-butanediol di(meth)acrylate, 1,6-hexanediol di(meth)acrylate, diethylene glycol di(meth)acrylate, triethylene glycol di(meth)acrylate, dipropyleneglycol di(meth)acrylate, tripropylene glycol di(meth)acrylate, polyethylene glycol di(meth)acrylate, neopentyl glycol di(meth)acrylate, trimethylolpropane tri(meth)acrylate, pentaerythritol tri(meth)acrylate and their ethoxylated equivalents as well as mixtures thereof, and still more preferably from the group consisting of trimethylolpropane triacrylate (TMPTA), pentaerytritol triacrylate (PTA), tripropyleneglycol diacrylate (TPGDA), dipropyleneglycol diacrylate (DPGDA), 1,6-hexanediol diacrylate (HDDA) as well as mixtures thereof.

The low energy radically curable offset or letterpress printing ink described herein comprising the (meth)acrylate compounds described herein may further comprise one or more vinyl ethers and/or their ethoxylated equivalents. Suitable vinyl ethers may be selected from the group consisting of ethyl vinyl ether (EVE), n-butyl vinyl ether (NBVE), iso-butyl vinyl ether (IBVE), cyclohexyl vinyl ether (CHVE), 2-ethylhexyl vinyl ether (EHVE), 1,4-butanediol divinyl ether (BDDVE), diethyleneglycol divinyl ether (DVE-2), triethyleneglycol divinyl ether (DVE-3), 1,4-cyclohexanedimethanol divinyl ether (CHDM-di), hydroxybutyl vinyl ether (HBVE), 1,4-cyclohexanedimethanol mono vinyl ether (CHDM-mono).

The low energy radically curable offset or letterpress printing ink described herein described herein comprises the one or more photoinitiators of formula (I):

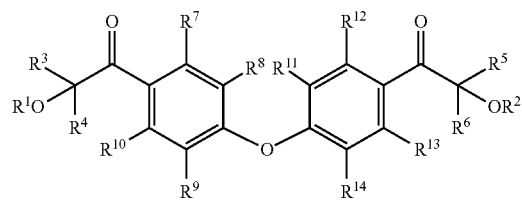

wherein
$R^1$, $R^2$ are identical or different from each other and are selected from the group consisting of hydrogen, $C_1$-$C_4$-alkyls (e.g. methyl, ethyl, propyl, isopropyl, cyclopropyl, butyl, isobutyl, sec-butyl, tert-butyl, cyclobutyl) and $Si(R^{15})_3$;

$R^3$, $R^4$, $R^5$, $R^6$ are identical or different from each other and are selected from the group consisting of hydrogen and $C_1$-$C_4$-alkyls (e.g. methyl, ethyl, propyl, isopropyl, cyclopropyl, butyl, isobutyl, sec-butyl, tert-butyl, cyclobutyl);

$R^7$, $R^8$, $R^9$, $R^{10}$, $R^{11}$, $R^{12}$, $R^{13}$, $R^{14}$ are identical or different from each other and are selected from the group consisting of hydrogen, $C_1$-$C_4$-alkyls (e.g. methyl, ethyl, propyl, isopropyl, cyclopropyl, butyl, isobutyl, sec-butyl, tert-butyl, cyclobutyl) and halogens, in particular fluorine, chlorine and bromine; and $R^{15}$ is selected from the group consisting of $C_1$-$C_4$-alkyls, phenyl, $C_1$-$C_4$-hydroxyalkyls and $C_5$-$C_8$-cycloalkyls.

According to a preferred embodiment, the low energy radically curable offset or letterpress printing ink described herein comprises the one or more photoinitiators of formula (I) wherein $R^1$, $R^2$ are identical or different from each other and are selected from the group consisting of hydrogen and $C_1$-$C_4$-alkyls (e.g. methyl, ethyl, propyl, isopropyl, cyclopropyl, butyl, isobutyl, sec-butyl, tert-butyl, cyclobutyl), and more preferably hydrogen;

$R^3$, $R^4$, $R^5$, $R^6$ are identical or different from each other are $C_1$-$C_4$-alkyls (e.g. methyl, ethyl, propyl, isopropyl, cyclopropyl, butyl, isobutyl, sec-butyl, tert-butyl, cyclobutyl), preferably $C_1$-alkyls (i.e. methyls); and $R^7$, $R^8$, $R^9$, $R^{10}$, $R^{11}$, $R^{12}$, $R^{14}$ are identical or different from each other and are selected from the group consisting of hydrogen, $C_1$-$C_4$-alkyls (e.g. methyl, ethyl, propyl, isopropyl, cyclopropyl, butyl, isobutyl, sec-butyl, tert-butyl, cyclobutyl) and halogens, in particular fluorine, chlorine and bromine, preferably from the group consisting of hydrogen and $C_1$-$C_4$-alkyls, and more preferably hydrogen.

According to a more preferred embodiment, the low energy radically curable offset or letterpress printing ink described herein described herein comprises the one or more photoinitiators, wherein at least one of said one or more photoinitiators is of formula (II):

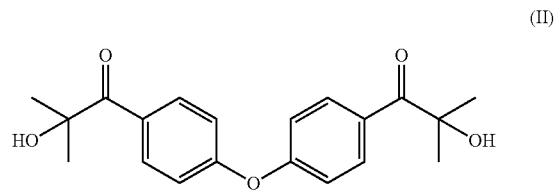 [SMILES: CC(C)(O)C(=O)c1ccc(Oc2ccc(C(=O)C(C)(C)O)cc2)cc1]

It should further be appreciated that the invention also extends to compounds in which one or more of the atoms have been replaced by an isotopic variant, such as for example one or more hydrogen atoms may be replaced by $^2H$ or $^3H$ and/or one or more carbon atoms may be replaced by $^{14}C$ or $^{13}C$.

Compounds of structure (II) suitable as photoinitiators described herein are commercially available as ESACURE® KIP 160 from IGM, the Netherlands, (CAS Number 71868-15-0).

The one or more photoinitiators comprised in the low energy radically curable offset or letterpress printing ink described herein are preferably present in a total amount from about 1 wt. % to about 20 wt-%, more preferably about 1 wt. % to about 15 wt. %, the weight percents being based on the total weight of the low energy radically curable offset or letterpress printing ink described herein.

The low energy radically curable offset or letterpress printing ink described herein may further comprise one or more inert resins (i.e. resins which do not take part in the polymerization reaction). Inert resins may be used to adjust the viscosity of the radically curable offset or letterpress printing ink described herein, to lower the glass transition temperature of an ink layer prepared with the radically curable offset or letterpress printing ink described herein, or to increase the adhesion of an ink layer prepared with the radically curable offset or letterpress printing ink described herein The one or more inert resins are preferably selected from the group consisting of hydrocarbons (such as e.g. styrene based hydrocarbon resins), acrylics (such as e.g. acrylic co-polymers), styreneallylalcohols, phenolic resins, rosin-modified resins, ketonic resins, alkyd resins and mixtures thereof. When present, the one or more inert resins described herein are present in the low energy curable wet offset or letterpress printing ink described herein in an amount from about 0.1 wt. % to about 10 wt-%, preferably in an amount from about 0.5 wt. % to about 2 wt. %, the weight percents being based on the total weight of the low energy curable wet offset or letterpress printing ink described herein.

The low energy radically curable offset or letterpress printing ink described herein may further comprise one or more sensitizers in conjunction with the one or more photoinitiators in order to achieve efficient curing. Typical examples of suitable sensitizers include without limitation isopropyl-thioxanthone (ITX), 1-chloro-2-propoxy-thioxanthone (CPTX), 2-chloro-thioxanthone (CTX), 2-methoxy-thioxanthone (MeOTX) and 2,4-diethyl-thioxanthone (DETX), polymeric derivatives of those and mixtures thereof. When present, the one or more sensitizers described herein are present are present in the low energy radically curable offset or letterpress printing ink in an amount from about 0.1 wt. % to about 5 wt-%, preferably in an amount from about 0.5 wt. % to about 2 wt-%, the weight percents being based on the total weight of the low energy radically curable offset or letterpress printing ink described herein.

The low energy radically curable offset or letterpress printing ink described herein may further comprise one or more UV-stabilizers in order to stabilize said ink in particular during its storage. Typical examples of suitable UV-stabilizers include without limitation, hydroquinone, hydroquinone monomethyl ether, 4-t-butylcatechol, 4-t-butyl-phenol, 2,6-di-t-butyl-4-methyl-phenol (BHT), pyrogallol, phenothiazine (PTZ), 2,4-diazabicyclo[2.2.2] octane (DABCO), copper (II) salts (such as e.g. copper (II) phenoxide, copper (II) acetylacetonate, copper (II) gluconate, copper (II) tartrate, copper (II) acetate, copper (II) carbamate, copper (II) thiocarbamate, copper (II) dithiocarbamate or copper (II) dimethyl dithiocarbamate), copper (I) salts (such as e.g. copper (I) chloride or copper (I) acetate), tris[N-(hydroxyl-κO)—N-(nitroso-κO)benzenaminato]-aluminum and mixtures thereof. When present, the one or more UV-stabilizers described herein are present in the low energy radically curable offset or letterpress printing ink in an amount from about 0.1 wt. % to about 5 wt-%, preferably in an amount from about 0.5 wt. % to about 2 wt-%, the weight percents being based on the total weight of the low energy radically curable offset or letterpress printing ink described herein.

The low energy radically curable offset or letterpress printing ink described herein further comprises one or more machine readable materials selected from the group consisting of luminescent materials, magnetic materials, IR absorbing materials and mixtures thereof. As used herein, the term "machine readable material" refers to a material which exhibits at least one distinctive property which is detectable by a device or a machine, such as for example a magnetic detector (when the machine readable materials have magnetic properties) or an IR-camera (when the machine readable materials have IR-absorbing properties), and which can be comprised in a security feature made from the low energy radically curable offset or letterpress printing ink described herein so as to confer a way to authenticate said security feature by the use of a particular equipment for its detection and/or authentication. The one or more machine readable materials described herein are present in an amount from about 1 wt. % to about 60 wt. %, preferably from about 5 wt. % to about 40 wt. %, the weight percents being based on the total weight of the low energy radically curable offset or letterpress printing ink.

Typical example of luminescent materials include without limitation inorganic pigments (inorganic host crystals or glasses doped with luminescent ions), organic or organometallic (complexes of luminescent ion(s) with organic ligand(s)) substances). Luminescent compounds can absorb certain types of energy acting upon them and subsequently emit at least partially this absorbed energy as electromagnetic radiation. Luminescent compounds are detected by exposing with a certain wavelength of light and analyzing the emitted light. Down-converting luminescent compounds absorb electromagnetic radiation at a higher frequency (shorter wavelength) and at least partially re-emit it at a lower frequency (longer wavelength). Up-converting luminescent compounds absorb electromagnetic radiation at a lower frequency and at least partially re-emit part of it at a higher frequency. Light emission of luminescent materials arises from excited states in atoms or molecules. The radiative decay of such excited states has a characteristic decay time, which depends on the material and can range from $10^{t3}$ seconds up to various hours. Both fluorescent and phosphorescent compounds are suitable for present invention. In the case of phosphorescent compounds, measurement of decay characteristics may also be carried out and used as a machine-readable feature. Luminescent compounds in pigment form have been widely used in inks (see U.S. Pat. No. 6,565,770, WO 2008/033059 A2 and WO 2008/092522 A1). Examples of luminescent compounds include among others sulphides, oxysulphides, phosphates, vanadates, etc. of non-luminescent cations, doped with at least one luminescent cation chosen from the group consisting of transition-metal and the rare-earth ions; rare earth oxysulfides and rare-earth metal complexes such as those described in WO 2009/005733 A2 or in U.S. Pat. No. 7,108,742. Examples of inorganic compounds materials include without limitation $La_2O_2S:Eu$, $ZnSiO_4:Mn$, and $YVO_4:Nd$. When present, the one or more luminescent materials are preferably present in an amount from about 1 to about 30 wt. %, the weight percents being based on the total weight of the low energy radically curable offset or letterpress printing ink.

Magnetic materials exhibit particular, detectable magnetic properties of the ferromagnetic or ferrimagnetic type and include permanent magnetic materials (hard-magnetic materials with coercivity Hc>1000 A/m) and magnetizable materials (soft-magnetic materials with coercivity Hc<=1000

A/m according to IEC60404-1 (2000)). Typical examples of magnetic materials include iron, nickel, cobalt, manganese and their magnetic alloys, carbonyl iron, chromium dioxide $CrO_2$, magnetic iron oxides (e.g. $Fe_2O_3$; $Fe_3O_4$), magnetic ferrites $M(II)Fe(III)_2O_4$ and hexaferrites $M(II)Fe(III)_{12}O_{19}$, the magnetic garnets $M(III)_3Fe(III)_5O_{12}$ (such as Yttrium Iron garnet $Y_3Fe_5O_{12}$) and their magnetic isostructural substitution products and particles with permanent magnetization (e.g. $CoFe_2O_4$). Magnetic pigments particles comprising a magnetic core material which is surrounded (coated) by at least one layer of another material such as those described in WO 2010/115986 A2 may also be used for the present invention. When present, the one or more magnetic materials are preferably present in an amount from about 5 to about 60 wt. %, the weight percents being based on the total weight of the low energy radically curable offset or letterpress printing ink.

Infrared (IR) absorbing materials. i.e. materials absorbing in the near-infrared (NIR) range of the electromagnetic spectrum, most generally in the 700 nm to 2500 nm wavelength range, are widely known and used as marking materials in security applications to confer to the printed documents an additional, covert, security element which help their authentication. For example, security features having IR-absorbing properties have been implemented in banknotes for use by automatic currency processing equipment, in banking and vending applications (automatic teller machines, automatic vending machines, etc.), in order to recognize a determined currency bill and to verify its authenticity, in particular to discriminate it from replicas made by color copiers. IR absorbing materials include IR absorbing Inorganic materials, glasses comprising substantial amounts of IR-absorbing atoms or ions or entities which display IR-absorption as a cooperative effect, IR absorbing organic materials and IR absorbing organometallic materials (complexes of cation(s) with organic ligand(s), wherein either the separate cation and/or the separate ligand, or both in conjunction, have IR-absorbing properties). Typical examples of IR absorbing materials include among others carbon black, quinone-diimmonium or aminium salts, polymethines (e.g. cyanines, squaraines, croconaines), phthalocyanine or naphthalocyanine type (IR-absorbing pi-system), dithiolenes, quaterrylene diimides, metal (e.g. transition metals or lanthanides) phosphates, lanthanum hexaboride, indium tin oxide, antimony tin oxide in nano-particulate form and doped tin(IV) oxide (cooperative property of the $SnO_4$ crystal). IR absorbing materials comprising a transition element compound and whose infrared absorption is a consequence of electronic transitions within the d-shell of transition element atoms or ions such as those described in WO 2007/060133 A2 may also be used for the present invention. When present, the one or more IR absorbing materials are preferably present in an amount from about 1 to about 40 wt. %, the weight percents being based on the total weight of the low energy radically curable offset or letterpress printing ink.

The low energy radically curable offset or letterpress printing ink described herein further comprises one or more filers and/or extenders in an amount from about 0.5 to about 20 wt. %, preferably from about 1 to about 10 wt. %, the weight percents being based on the total weight of the low energy radically curable offset or letterpress printing ink. Preferably the one or more filers and/or extenders are elected from the group consisting of carbon fibers, talcs, micas (muscovites), wollastonites, day (calcinated days and china clays), kaolins, carbonates (e.g. calcium carbonate, sodium aluminum carbonate), silicates (e.g. magnesium silicate, aluminum silicate), sulfates (e.g. magnesium sulfate, barium sulphate), titanates (e.g. potassium titanate), alumina hydrates, silica (also including fumed silicas), montmorillonites, graphites, anatases, rutiles, bentonites, vermiculites, zinc whites, zinc sulphides, wood flours, quartz flours, natural fibers, synthetic fibers and combinations thereof. More preferably, the one or more fillers and/or extenders are selected from the group consisting of carbonates (e.g. calcium carbonate, sodium aluminum carbonate), silicas, talcs, clays and mixtures thereof.

The low energy radically curable offset or letterpress printing ink described herein may further comprise a) one or more dyes, and/or b) inorganic pigments, organic pigments or mixtures thereof.

Dyes suitable for inks are known in the art and are preferably selected from the group comprising reactive dyes, direct dyes, anionic dyes, cationic dyes, acid dyes, basic dyes, food dyes, metal-complex dyes, solvent dyes and mixtures thereof. Typical examples of suitable dyes include without limitation coumarines, cyanines, oxazines, uranines, phtalocyanines, indolinocyanines, triphenylmethanes, naphtalocyanines, indonanaphtalo-metal dyes, anthraquinones, anthrapyridones, azo dyes, rhodamines, squarilium dyes, croconium dyes. Typical examples of dyes suitable for the present invention include without limitation C.I. Acid Yellow 1, 3, 5, 7, 11, 17, 19, 23, 25, 29, 36, 38, 40, 42, 44, 49, 54, 59, 61, 70, 72, 73, 75, 76, 78, 79, 98, 99, 110, 111, 121, 127, 131, 135, 142, 157, 162, 164, 165, 194, 204, 236, 245; C.I. Direct Yellow 1, 8, 11, 12, 24, 26, 27, 33, 39, 44, 50, 58, 85, 86, 87, 88, 89, 98, 106, 107, 110, 132, 142, 144; C.I. Basic Yellow 13, 28, 65; C.I. Reactive Yellow 1, 2, 3, 4, 6, 7, 11, 12, 13, 14, 15, 16, 17, 18, 22, 23, 24, 25, 26, 27, 37, 42; C.I. Food Yellow 3, 4; C.I. Acid Orange 1, 3, 7, 10, 20, 76, 142, 144; C.I. Basic Orange 1, 2, 59; C.I. Food Orange 2; C.I. Orange B; C.I. Acid Red 1, 4, 6, 8, 9, 13, 14, 18, 26, 27, 32, 35, 37, 42, 51, 52, 57, 73, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 221, 249, 252, 254, 262, 265, 274, 282, 289, 303, 317, 320, 321, 322, 357, 359; C.I. Basic Red 1, 2, 14, 28; C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, 231, 253; C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, 64, 108, 180; C.I. Food Red 1, 7, 9, 14; C.I. Acid Blue 1, 7, 9, 15, 20, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 193, 199, 203, 204, 205, 229, 234, 236, 249, 254, 285; C.I. Basic Blue 1, 3, 5, 7, 8, 9, 11, 55, 81; C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, 249; C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, 46, 77; C.I. Food Blue 1, 2; C.I. Acid Green 1, 3, 5, 16, 26, 104: C.I. Basic Green 1, 4; C.I. Food Green 3; C.I. Acid Violet 9, 17, 90, 102, 121; C.I. Basic Violet 2, 3, 10, 11, 21; C.I. Acid Brown 101, 103, 165, 266, 268, 355, 357, 365, 384; C.I.

Basic Brown 1; C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, 191, 194; C.I. Direct Black 17, 19, 22, 32, 39, 51, 56, 62, 71, 74, 77, 94, 105, 106, 107, 108, 112, 113, 117, 118, 132, 133, 146, 154, 168: C.I. Reactive Black 1, 3, 4, 5, 6, 8, 9, 10, 12, 13, 14, 18, 31; C.I. Food Black 2; C.I. Solvent Yellow 19. C.I. Solvent Orange 45, C.I. Solvent Red 8, C.I. Solvent Green 7, C.I. Solvent Blue 7, C.I. Solvent Black 7; C.I. Disperse Yellow 3, C.I. Disperse Red 4, 60, C.I. Disperse Blue 3, and metal azo dyes disclosed in U.S. Pat. No. 5,074,914. U.S. Pat. Nos. 5,997, 622, 6,001,161, JP 02-080470, JP 62-190272, JP 63-218766. Suitable dyes for the present invention may be infrared absorbing dyes or luminescent dyes. When present, the one or more dyes used in the low energy radically curable offset or letterpress printing ink described herein are preferably present in an amount from about 1 to about 30 wt. %, the weight percents being based on the total weight of the low energy radically curable offset or letterpress printing ink.

Typical examples of organic and inorganic pigments include without limitation C.I. Pigment Yellow 12, C.I. Pigment Yellow 42, C.I. Pigment Yellow 93, C.I. Pigment Yellow 110, C.I. Pigment Yellow 147, C.I. Pigment Yellow 173, C.I. Pigment Orange 34, C.I. Pigment Orange 48, C.I. Pigment Orange 49, C.I. Pigment Orange 61, C.I. Pigment Orange 71 C.I. Pigment Orange 73, C.I. Pigment Red 9, C.I. Pigment Red 22, C.I. Pigment Red 23, C.I. Pigment Red 67, C.I. Pigment Red 122, C.I. Pigment Red 144. C.I. Pigment Red 146, C.I. Pigment Red 170, C.I. Pigment Red 177, C.I. Pigment Red 179, C.I. Pigment Red 185, C.I. Pigment Red 202, C.I. Pigment Red 224, C.I. Pigment Brown 6, C.I. Pigment Brown 7, C.I. Pigment Red 242, C.I. Pigment Red 254, C.I. Pigment Red 264, C.I. Pigment Brown 23, C.I. Pigment Blue 15, C.I. Pigment Blue 15.3. C.I. Pigment Blue 60, C.I. Pigment Violet 19, C.I. Pigment Violet 23, C.I. Pigment Violet 32, C.I. Pigment Violet 37, C.I. Pigment Green 7, C.I. Pigment Green 36, C.I. Pigment Black 7, C.I. Pigment Black 11, C.I. Pigment White 4, C.I. Pigment White 6. C.I. Pigment White 7, C.I. Pigment White 21, C.I. Pigment White 22, antimony yellow, lead chromate, lead chromate sulfate, lead molybdate, ultramarine blue, cobalt blue, manganese blue, chrome oxide green, hydrated chrome oxide green, cobalt green, cerium sulfide, cadmium sulfide, cadmium sulfoselenides, zinc ferrite, bismuth vanadate, Prussian blue, mixed metal oxides, azo, azomethine, methine, anthraquinone, phthalocyanine, perinone, perylene, diketopyrrolopyrrole, thioindigo, thiazinindigo, dioxazine, iminoisoindoline, iminoisoindolinone, quinacridone, flavanthrone, indanthrone, anthrapyrimidine and quinophthalone pigments. When present, the inorganic pigments, organic pigments or mixtures thereof described herein are preferably present in an amount from about 0.1 to about 45 wt. %, the weight percents being based on the total weight of the low energy radically curable offset or letterpress printing ink.

The low energy radically curable offset or letterpress printing ink described herein may further comprise one or more waxes preferably selected from the group consisting of synthetic waxes, petroleum waxes and natural waxes. Preferably the one or more waxes are selected from the group consisting of amide waxes, erucamide waxes, paraffin waxes, polyethylene waxes, polypropylene waxes, fluorocarbon waxes, polytetrafluoroethylene waxes, Fischer-Tropsch waxes, silicone fluids, bee waxes, candelilla waxes, montan waxes, carnauba waxes and mixtures thereof, more preferably selected from the group consisting of paraffin waxes, polyethylene waxes, fluorocarbon waxes, polytetrafluoroethylene waxes, carnauba waxes and mixtures thereof. When present, the one or more waxes are preferably present in an amount from about 0.1 to about 5 wt. %, the weight percents being based on the total weight of the low energy radically curable offset or letterpress printing ink.

As known by those skilled in the art, the low energy radically curable offset or letterpress printing ink described herein may further comprise one or more solvents and/or diluents.

The low energy radically curable offset or letterpress printing ink described herein may further comprise additives that include, but are not limited to, one or more of the following components as well as combinations of these: co-initiators, anti-settling agents, anti-foaming agents, surfactants and other processing aids known in the field of inks. Additives described herein may be present in the low energy curable wet offset printing Inks described herein. In amounts and in forms known in the art, including in the form of so-called nano-materials where at least one of the dimensions of the particles is in the range of 1 to 1000 nm.

The low energy radically curable offset or letterpress printing ink described herein is typically prepared by a method comprising a step of dispersing, mixing and/or milling all the ingredients described herein, the one or more machine readable materials described herein, the one or more one or more filers and/or extenders described herein, the one or more dyes described herein when present, the inorganic pigments, organic pigments or mixtures thereof described herein when present, the one or more waxes described herein when present, and the one or more additives when present in the presence of the (meth)acrylate compounds described herein, thus forming pasty compositions. The one or more photoinitiators described herein may be added to the ink either during the dispersing or mixing step of all other ingredients or may be added at a later stage.

As described herein, the process described herein comprises a step of applying the low energy radically curable offset or letterpress printing ink described herein by offset printing or letterpress printing so as to form a coating or layer, and curing the coating or layer with a UV lamp (280 to 400 nm) at a dose of at least 50 mJ/cm$^2$, preferably at least 100 mJ/cm$^2$. As described hereafter, the dose may be measured using a UV Power Puck® II radiometer from EIT, Inc., U.S.A.

The coating or layer made of the low energy radically curable offset or letterpress printing ink described herein is UV-cured with a UV LE lamp preferably selected from Baldwin UV Ltd. United Kingdom, IST METZ GmbH Germany or Dr. Hönle AG, Germany.

In order to gain a better distinction of the tested photoinitiators' reactivity and to investigate the kinetic of the reaction as a function of the dose, the low energy radically curable offset or letterpress printing ink described herein was cured at two doses of 100 mJ/cm$^2$ (typical industrial dose) and 50 mJ/cm$^2$ with a UV-LE lamp by varying the transportation belt speed.

The process described herein is particularly suitable for producing a security feature on a substrate that is suitable as substrate for a security document. According to one preferred embodiment, the security feature is used as background printing on the substrate to be subsequently printed or processed. This means that on top of the security feature printed by the process described herein, i.e. the image, pattern or graphic element that serves for authentication purposes, further security features or non-security features are printed or applied in one or more further printing or applying runs and the security feature printed by the process described herein and the further security or non-security features overlap.

Typical examples of substrate include without limitation fiber-based substrates, preferably substrates based on cellulosic fibers such as paper, paper-containing materials, polymer-based substrates, composite materials (e.g. substrates obtained by the lamination of paper layers and polymer films), metals or metalized materials, glasses, ceramics and combinations thereof. Typical examples of polymer-based substrates are substrates made of ethylene- or propylene-based homo- and copolymers such as polypropylene (PP) and polyethylene (PE), polycarbonate (PC), polyvinyl chloride (PVC) and polyethylene terephthalate (PET). Typical examples of composite materials include without limitation multilayer structures (e.g. laminates) of at least one paper layer and at least one polymer film, including polymers such as those described above, as well as paper-like substrates based on mixtures of cellulosic fibers and synthetic polymer fibers. In one preferred embodiment the security features is printed on a substrate selected from offset papers and fiduciary papers. Offset paper is manufactured from wood-pulp cellulose with properties that make the paper suitable for offset printing, including dimensional stability, resistance to curling, high surface strength, a surface free from foreign particles and a high level of resistance to moisture penetration. Typically the basis weight of offset paper is of 30 g/m$^2$ to 250 g/m$^2$, preferably of 50 g/m$^2$ to 150 g/m$^2$.

Fiduciary paper (also referred in the art as security paper) is manufactured from lignin-free, cotton-pulp cellulose. Compared to offset papers, additional properties of fiduciary papers include enhanced mechanical resistance (especially resistance to tearing and wearing), resistance to soling and treatment against degradation by micro-organisms (bacteria, virus and fungi). The mechanical resistance of fiduciary papers may be enhanced by the introduction into the paper (cotton-based) pulp of synthetic fibers, and the anti-soiling performance may be improved by coating or printing an anti-soil polymeric layer prior to printing or applying the security features of the banknote. Usually, the treatment with biocides is combined with the anti-soil treatment. Typically, the fiduciary paper has a basis weight of 50 to 150 g/m$^2$, preferably of 80 to 120 g/m$^2$.

Furthermore, the use of fiduciary paper instead of offset paper adds an additional element of anti-counterfeiting protection, since fiduciary paper is manufactured on special paper-making machines that are only available to manufacturers of security paper, and since the supply chain is protected such as to prevent the fiduciary paper from being diverted to counterfeiters.

The term "security document" refers to a document having a value such as to render it potentially liable to attempts at counterfeiting or illegal reproduction and which is usually protected against counterfeit or fraud by one or more security features. Examples of security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, bank cards, credit cards, transactions cards, access documents, security badges, entrance tickets, transportation tickets or titles, and the like.

The term "value commercial good" refers to packaging material, in particular for pharmaceutical, cosmetics, electronics or food industry that may comprise one or more security features in order to warrant that the content of the packaging is genuine, like for instance genuine drugs. Example of these packaging material include without limitation labels such as authentication brand labels, tax banderoles, tamper evidence labels and seals. The security document described herein may further comprise one or more additional layers or coatings either below or on top of the security feature described herein. Should the adhesion between the substrate and the security feature described herein be insufficient, for example, due to the substrate material, a surface unevenness or a surface inhomogeneity, an additional layer, coating or a primer between the substrate and the security feature might be applied as known for those skilled in the art.

With the aim of further increasing the security level and the resistance against counterfeiting and illegal reproduction of security documents, the substrate may contain watermarks, security threads, fibers, planchettes, luminescent compounds, windows, foils, decals, coatings and combinations thereof.

The substrate described herein, on which the low energy radically curable offset or letterpress printing Ink described herein is applied, may consist of an intrinsic part of a security document, or alternatively, the low energy radically curable offset or letterpress printing ink described herein Is applied onto an auxiliary substrate such as for example a security thread, security stripe, a foil, a decal or a label and consequently transferred to a security document in a separate step.

Also described herein are uses of the one or more photoinitiators described herein for producing the low energy radically curable offset or letterpress printing ink described herein, said low energy radically curable offset or letterpress printing ink being suitable for printing a security feature on a security document.

Example

The present invention is now described in more details with reference to non-limiting examples. The Examples below provide more detail for the preparation of low energy radically curable printing inks and use of the photoinitiators according to the invention and comparative data.

The irradiation doses were determined by using a Power Puck® II device. The irradiation source (LE mercury medium pressure lamp) was turned on. The Power Puck® II device was placed on the belt of the Irradiation apparatus designed to receive the samples to be irradiated. The Power Puck® was Irradiated with the irradiation source at different belt's speed. The dose was obtained by summing the doses of the UVA, UVB and UVC measured of the Power Puck® II. The following values were obtained with a HUV lamp type J (Baldwin, Ozone free lamp J7804045): 50 mJ/cm$^2$ at 100 m/min, 100 mJ/cm$^2$ at 50 m/min.

Influence of the Photoinitiator on the Whiteness of a Printed and Cured Layer Made of Radically Curable Test Varnishes The radically curable whiteness test varnishes of Table 2 were prepared in order to assess the influence of the tested photoinitiators described in Table 1 on the whiteness (expressed in degrees Berger) of the printed test varnish layer after UV-curing.

TABLE 1 photoinitiators

| Photoinitiator Number | Photoinitiator Name | CAS Number | Structure |
| --- | --- | --- | --- |
| P1 | ESACURE® KIP 160 (IGM Resins, previously Lamberti) | [71868-15-0] | |
| P2 | DAROCUR® 1173 (IGM Resins, previously BASF) | [7473-93-5] | |
| P3 | IRGACURE® 2959 (IGM Resins, previously BASF) | [106797-53-9] | |
| P4 | ESACURE® ONE (IGM Resins) | [135452-42-5] | |
| P5 | ESACURE® KIP 150 (IGM Resins, previously Lamberti) | — | |
| P6 | IRGACURE® 184 (IGM Resins, previously BASF) | [947-19-3] | |
| P7 | GENOCURE BDK (Rahn) | [24650-42-8] | |

TABLE 1-continued photoinitiators

| Photoinitiator Number | Photoinitiator Name | CAS Number | Structure |
|---|---|---|---|
| P8 | GENOPOL AB-2 (Rahn) | — | |
| P9 | OMNIPOL 910 (IGM Resins) | [886463-10-1] | Polymeric derivative of |
| P10 | GENOCURE TPO (Rahn) | [75980-60-8] | |
| P11 | IRGACURE® 819 (IGM Resins, previously BASF) | [162881-26-7] | |
| P12 | GENOCURE LTM (Rahn) | — | Photoinitiators blend comprising |
| P13 | GENOCURE ITX (Rahn) | [5495-84-1] | |

TABLE 1-continued photoinitiators

| Photoinitiator Number | Photoinitiator Name | CAS Number | Structure |
|---|---|---|---|
| P14 | OMNIPOL TX (IGM Resins) | [813452-37-8] | 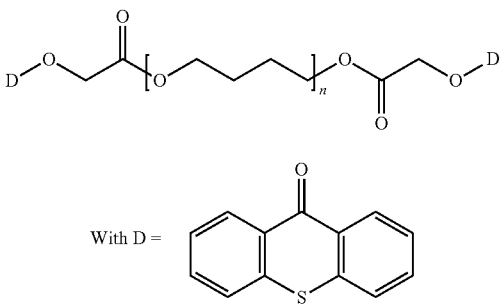 |
| | | | With D = 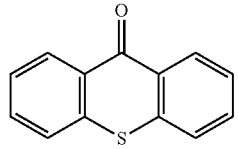 |
| P15 | GENOPOL TX-2 (Rahn) | — | unknown |

TABLE 2 radically curable transparent whiteness test varnishes (whiteness assessment)

| Ingredients | wt. % |
|---|---|
| Trimethylolpropane triacrylate (TMPTA) (UV Monomer) (Allnex) | 63.05 |
| Laropal ® A 81 (Resin) (BASF) | 33.95 |
| Photoinitiator of Table 1 (Photoinitiator) | 3 |

Preparation of the Radically Curable Whiteness Test Varnishes of Table 2

The radically curable transparent whiteness test varnishes were independently prepared by mixing the ingredients described in Table 2, except the photoinitiator with a mixer IKA T ULTRA TURRAX until the temperature of the mixture reached 60-65° C.

The photoinitiators were independently added and the resulting mixtures were independently dispersed with a Speedmixer DAC 150 for three minutes, ground on a Loher mill (3×50 turns with a weight of 7.5 kg) and dispersed again with a Speedmixer DAC 150 for three minutes.

Printing and Curing Method

The radically curable transparent whiteness test varnishes were independently printed on a substrate (fiduciary paper, Papierfabrik Louisenthal GmbH) on a Prüfbau at 800 N, so as to obtain a printed layer. The radically curable transparent whiteness test varnishes were independently cured and dried with a Hg-lamp (Aktiprint Mini 18.2) at a belt speed of 10 m/min so as to form printed and cured test varnish layers. The exact amount of the printed and cured test varnish layers was calculated for each sample by weighting the substrate before and after printing. The weight of the printed and cured test varnish layers of all the samples was 2 g/m²±3%.

The substrates carrying the printed and cured test varnish layer were kept in the dark for five days and the whiteness of said samples was independently and subsequently measured with a DC45 spectrophotometer: the whiteness value of the substrate (average value of three measurements) was subtracted from the whiteness value of the printed and cured test varnish layer (average value of three measurements). Larger negative values indicated a stronger yellowing of the printed and test varnish layers. The whiteness of each sample is provided in Table 4.

Influence of the Photoinitiator on the Curing Efficiency of a Layer Made of Radically Curable Black Fluorescent Offset Printing Inks The radically curable black fluorescent offset printing inks of Table 3 were prepared in order to assess the influence of the photoinitiators of Table 1 on the curing of said inks. The curing performance of each photoinitiator was assessed by a counter-pressure test.

TABLE 3 radically curable black fluorescent offset printing inks

| Ingredients | wt. % |
|---|---|
| EBECRYL ® 811 (polyester acrylate, oligomer) (Allnex) | 38.5 |
| EBECRYL ® 1606 (bisphenol A epoxy diacrylate diluted with 20-25% of trimethylolpropane triacrylate monomer) (Allnex) | 25.41 |
| EBECRYL ® 150 (ethoxylated bisphenol A diacrylate oligomer) (Allnex) | 11.55 |
| MIRAMER M4004 (Pentaerythritol ethoxylated tetraacrylate monomer) (Rahn) | 3 |
| FLORSTAB UV 1 (copper (II) dimethyl-dithiocarbamate, UV stabilizer) (Kromatech) | 1.54 |
| SHAMROCK WAX S394 N1 (Polyethylene wax) (Shamrock) | 0.5 |
| FINNTALC MOS (Talc (Mg-Silicate), filler) (Grolman) | 0.5 |
| BENTONE 34 (organic derivative of a bentonite clay, filler) (Elementis) | 0.5 |
| AEROSIL ® 200 (fumed silica, extender,) (Evonik) | 0.5 |
| Lumilux ® Yellow CD 382 (salicylic acid derivative, luminescent pigment) (Honeywell Specialty Materials) | 3 |
| Lumilux ® Green CD 394 (chinazolinon derivative, luminescent pigment) (Honeywell Specialty Materials) | 3 |
| Carbon Black 4A (black pigment, IR-absorbing pigment) (Orion) | 7 |
| Genocure EHA (2-ethylhexyl-4-dimethylaminobenzoate, Co-initiator I) (Rahn) | 2 |
| Photoinitiator of Table 1 | 3 |

Preparation of the Radically Curable Black Fluorescent Offset Printing Inks of Table 3

The radically curable black fluorescent offset printing inks were independently prepared by mixing with the SpeedMixer™ (DAC 150 SP CM31 from Hauschild Engineering) at room temperature the ingredients listed in Table 3, except the photoinitiators. The resulting pastes were independently ground on a SDY300 three roll mill in three passes (a first pass at a pressure of 5 bars, a second and a third pass at a pressure of 11 bars).

The photoinitiators were independently added to the pastes obtained as described hereabove and the so-obtained inks were mixed in a SpeedMixer™ (DAC 150 SP CM31 from Hauschild Engineering) at a speed of 2500 rpm for three minutes at room temperature, ground on a Loher mil (3×50 turns with a weight of 7.5 kg), and mixed again with the SpeedMixer™ for three minutes.

The viscosity of the radically curable black fluorescent offset printing inks of Table 2 was measured at 40° C. and 1000 s$^{-1}$ on a Haake Roto-Visco RV1 with a cone 2 cm 0.5°, linear speed increase 0-1000 sec$^{-1}$ in 30 seconds and are provided in Table 4.

Printing and Curing Method

The radically curable black fluorescent offset printing Inks were independently printed as a pattern (4.5 cm×23 cm) on a Guardian® substrate (Innovia) using a Prüfbau at a pressure of 1000 N (T=22° C., relative humidity=54%). The patterns were divided in three parts and each sample was dried under two different irradiation doses to assess the curing performance of the photoinitiator using a HUV lamp type J (Baldwin, Ozone free lamp J7804045). The belt speed of the curing drier was selected according to the different tested doses as measured with a UV Power Puck® II radiometer from EIT, Inc., U.S.A.: 100 m/min for a dose of 50 mJ/cm$^2$, 50 m/min for a dose of 100 mJ/cm$^2$. The two doses were selected such as to discriminate the different reactivity of the tested photoinitiators and to investigate the kinetic of the reaction as a function of the dose.

Curing Test by Counter-Pressure

For each sample, a drying test was carried out by forming an assembly consisting of a sheet of the substrate carrying the printed and cured ink layer and a blank fiduciary paper placed on top of said substrate carrying the printed and cured ink layer and by submitting the so-formed assembly to a counter-pressure of 3.4 bars at 80° C. with an ORMAG Intaglio Proof Press. The substrate carrying the printed and cured ink layer and the blank fiduciary paper were separated and the optical density of the blank fiduciary paper was checked for ink transfer.

The measured optical density (Techkon SpectroDens Advanced, ISO 5-3 status E, Techkon GmbH Germany) of the counterpressure test on the blank fiduciary paper after contact with the uncured ink layer on the Guardian® substrate is defined as 0% cure. The measured optical density of the blank fiduciary paper is defined as 100% cure (no setoff). The measured optical density of each sample at the different irradiation doses are provided in Table 4.

Table 5 provides a summary of all the results.

TABLE 4 whiteness test results and curing tests results

| Example | Photoinitiator Number | Δ Whiteness/(degree Berger) of the radically curable radically curable whiteness test varnishes of Table 2 | Viscosity/(Pa · s) of the radically curable black fluorescent inks of Table 3 | Counter-pressure test results at two irradiation doses[a]/(%) | |
|---|---|---|---|---|---|
| | | | | 50 mJ/cm$^2$ | 100 mJ/cm$^2$ [b] |
| E1 | P1 | −2.43 | 3.72 | 73 | 95 |
| C1 | P2 | −1.20 | 2.76 | 9 | 9 |
| C2 | P3 | −2.26 | 3.56 | 4 | 2 |
| C3 | P4 | −2.19 | 3.99 | 45 | 60 |
| C4 | P5 | −1.24 | 4.11 | 18 | 52 |
| C5 | P6 | −1.06 | 3.13 | 2 | 4 |
| C6 | P7 | −1.27 | 3.31 | 30 | 30 |
| C7 | P8 | −2.30 | 3.81 | 7 | 7 |
| C8 | P9 | −10.91 | 4.63 | 83 | 78 |
| C9 | P10 | −1.45 | 3.88 | 56 | 61 |
| C10 | P11 | −1.67 | 3.90 | 68 | 77 |
| C11 | P12 | −1.25 | 3.10 | 14 | 14 |
| C12 | P13 | −4.31 | 3.33 | 62 | 66 |
| C13 | P14 | −7.82 | 3.96 | 46 | 47 |
| C14 | P15 | −4.19 | 4.02 | 23 | 30 |

[a]Error margin: +/−5%.
[b] 100 mJ/cm$^2$ corresponds to a typical industrial dose.

TABLE 5 summary of results

| Example | Photoinitiator Number | Photoinitiator Name | Δ Whiteness | Counter-pressure |
|---|---|---|---|---|
| E1 | P1 | ESACURE ® KIP 160 | + | ++ |
| C1 | P2 | DAROCUR ® 1173 | ++ | −− |
| C2 | P3 | IRGACURE ® 2959 | + | −− |
| C3 | P4 | ESACURE ® ONE | + | + |
| C4 | P5 | ESACURE ® KIP 150 | ++ | + |
| C5 | P6 | IRGACURE ® 184 | ++ | −− |
| C6 | P7 | GENOCURE BDK | ++ | − |
| C7 | P8 | GENOPOL AB-2 | + | −− |
| C8 | P9 | OMNIPOL 910 | −− | ++ |
| C9 | P10 | GENOCURE TPO | ++ | + |
| C10 | P11 | IRGACURE ® 819 | ++ | + |
| C11 | P12 | GENOCURE LTM | ++ | −− |
| C12 | P13 | GENOCURE ITX | − | + |
| C13 | P14 | OMNIPOL TX | −− | − |
| C14 | P15 | GENOPOL TX-2 | − | − |

As shown in Tables 4 and 5, the photoinitiator P1 (used in E1) led to good results not only in whiteness tests but also in counter-pressure tests even at very low irradiation doses (50 mJ/cm$^2$). Whereas the inks comprising the photoinitiators P9 (used in C8) and P11 (used in C12), respectively, led to good results in terms of curing performance at a low irradiation doses (at 50 mJ/cm$^2$), an increase of the dose to 100 mJ/cm$^2$ did not result in an increase of the curing performance to a level comparable to E1. Moreover, the photoinitiator P9 (used in C8) exhibited a very poor performance in terms of whiteness. All the comparative examples P2-P8 and P12-P15 resulted in either negative yellowing performance (large negative values in whiteness test) and/or poor curing performance.

The invention claimed is:

1. A low energy radically curable offset or letterpress printing ink having a viscosity in the range of about 2.5 to about 25 Pa s at 40° C. and 1000 s$^{-1}$ for printing a security feature on a substrate or security document, said low energy radically curable offset or letterpress printing ink comprising:
   i) from about 10 wt. % to about 80 wt. % of radically curable (meth)acrylate compounds;
   ii) from about 1 wt. % to about 20 wt. % of one or more photoinitiators of formula (I):

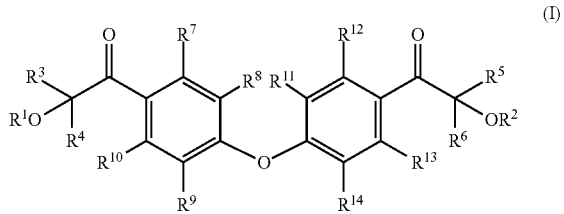

wherein
   $R^1$, $R^2$ are identical or different from each other and are selected from the group consisting of hydrogen, $C_1$-$C_4$-alkyls and $Si(R^{15})_3$;
   $R^3$, $R^4$, $R^5$, $R^6$ are identical or different from each other and are selected from the group consisting of hydrogen and $C_1$-$C_4$-alkyls;
   $R^7$, $R^8$, $R^9$, $R^{10}$, $R^{11}$, $R^{12}$, $R^{13}$, $R^{14}$ are identical or different from each other and are selected from the group consisting of hydrogen, $C_1$-$C_4$-alkyls and halogens; and
   $R^{15}$ is selected from the group consisting of $C_1$-$C_4$-alkyls, phenyl, $C_1$-$C_4$-hydroxyalkyls and $C_5$-$C_8$-cycloalkyls;
   iii) from about 1 wt. % to about 60 wt. % of one or more machine readable materials selected from the group consisting of luminescent materials, magnetic materials, IR absorbing materials and mixtures thereof; and
   iv) from about 0.5 wt. % to about 20 wt. % of one or more fillers and/or extenders, the weight percents being based on the total weight of the low energy radically curable offset or letterpress printing ink.

2. The low energy radically curable offset or letterpress printing ink according to claim 1, wherein at least one of the one or more photoinitiators is of formula (II):

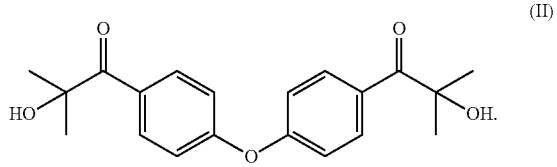 [SMILES: CC(C)(O)C(=O)c1ccc(Oc2ccc(C(=O)C(C)(C)O)cc2)cc1]

3. The low energy radically curable offset or letterpress printing ink according to claim 1, wherein the one or more fillers and/or extenders are selected from the group consisting of carbonates, silicas, talcs, clays and mixtures thereof.

4. The low energy radically curable offset or letterpress printing ink according to claim 1, wherein the radically curable (meth)acrylate compounds consist of one or more radically curable (meth)acrylate oligomers and one or more radically curable (meth)acrylate monomers.

5. The low energy radically curable offset or letterpress printing ink according to claim 1, further comprising a) one or more dyes and/or b) inorganic pigments, organic pigments or mixtures thereof.

6. The low energy radically curable offset or letterpress printing ink according to claim 1, further comprising one or more waxes selected form the group consisting of paraffin waxes, polyethylene waxes, fluorocarbon waxes, polytetrafluoroethylene waxes, carnauba waxes and mixtures thereof.

7. A process for printing a security feature on a substrate by an offset or letterpress printing process comprising the steps of:
   a) applying the low energy radically curable offset or letterpress printing ink recited in claim 1 by offset printing or letterpress printing so as to form a coating or layer, and
   b) curing the coating or layer with an ultraviolet lamp having a wavelength of 280 to 400 nm at a dose of at least 50 mJ/cm$^2$.

8. A security feature comprising a coating or a layer made of the low energy radically curable offset or letterpress printing ink recited in claim 1.

9. A security document comprising one or more security features recited in claim 8.

10. The low energy radically curable offset or letterpress printing ink according to claim 1, wherein $R^1$, $R^2$ are selected from the group consisting of hydrogen and $C_1$-$C_4$-alkyls.

11. The low energy radically curable offset or letterpress printing ink according to claim 1, wherein $R^1$, $R^2$ are hydrogen.

12. The low energy radically curable offset or letterpress printing ink according to claim 1, wherein $R^3$, $R^4$, $R^5$, $R^6$ are $C_1$-$C_4$-alkyls.

13. The low energy radically curable offset or letterpress printing ink according to claim 1, wherein $R^3$, $R^4$, $R^5$, $R^6$ are methyls.

14. The low energy radically curable offset or letterpress printing ink according to claim 1, wherein $R^7$, $R^8$, $R^9$, $R^{10}$, $R^{11}$, $R^{12}$, $R^{13}$, $R^{14}$ are selected from the group consisting of hydrogen and $C_1$-$C_4$-alkyls.

15. The low energy radically curable offset or letterpress printing ink according to claim 1, wherein $R^7$, $R^8$, $R^9$, $R^{10}$, $R^{11}$, $R^{12}$, $R^{13}$, $R^{14}$ are hydrogen.

16. The process for printing a security feature on a substrate by an offset or letterpress printing process according to claim 7, wherein in step b) curing the coating or layer with the ultraviolet lamp is performed at a dose of at least 100 mJ/cm$^2$.

* * * * *